United States Patent [19]

Abel et al.

[11] 4,328,220
[45] May 4, 1982

[54] NON-DUSTY PULVERULENT AND GRANULATED ORGANIC DYE PREPARATIONS

[75] Inventors: Heinz Abel, Reinach; Beat Bruttel, Möhlin; Arthur Bühler, Rheinfelden, all of Switzerland

[73] Assignee: Ciba-Geigy Corporation, Ardsley, N.Y.

[21] Appl. No.: 159,257

[22] Filed: Jun. 13, 1980

Related U.S. Application Data

[63] Continuation of Ser. No. 870,900, Jan. 19, 1978, abandoned.

[30] Foreign Application Priority Data

Jan. 24, 1977 [LU] Luxembourg .......................... 76632

[51] Int. Cl.$^3$ .................. D06P 1/10; D06P 1/645; D06P 1/90
[52] U.S. Cl. .......................... 424/226; 8/582; 8/583; 8/585; 8/588; 8/594; 8/595; 260/410.6; 260/410.7; 260/410.8; 260/208
[58] Field of Search ............... 260/410.6, 410.7, 410.8, 260/584 B, 314.5, 146 A; 8/181, 594, 597, 598, 582, 583, 585, 588, 595; 424/226

[56] References Cited

U.S. PATENT DOCUMENTS

| | | | |
|---|---|---|---|
| 3,221,514 | 10/1965 | Conty et al. ............................ | 8/93 |
| 3,736,096 | 5/1973 | Nichols et al. ........................ | 8/62 |
| 3,765,831 | 10/1973 | Senez .................................... | 8/54 |
| 3,960,486 | 6/1976 | Daubach et al. ...................... | 8/79 |
| 3,994,680 | 11/1976 | Mueller et al. ........................ | 8/62 |
| 4,042,320 | 8/1977 | Becker et al. ........................ | 8/39 C |
| 4,055,393 | 10/1977 | Schafer et al. ........................ | 8/62 |
| 4,061,464 | 12/1977 | Hahnke et al. ........................ | 8/79 |
| 4,071,468 | 1/1978 | Abel et al. ............................ | 8/92 X |
| 4,110,073 | 8/1978 | Mollet et al. ........................ | 8/85 R |

FOREIGN PATENT DOCUMENTS

| | | | |
|---|---|---|---|
| 873231 | 6/1971 | Canada ................................... | 8/45 |
| 2657994 | 7/1977 | Fed. Rep. of Germany ............ | 8/93 |
| 2179137 | 11/1973 | France .................................. | 8/93 |
| 2277126 | 1/1976 | France .................................. | 8/93 |
| 1368322 | 9/1974 | United Kingdom .................... | 8/93 |
| 1400580 | 7/1975 | United Kingdom .................... | 8/93 |

*Primary Examiner*—Floyd D. Higel
*Attorney, Agent, or Firm*—Edward McC. Roberts

[57] ABSTRACT

Non-dusting pulverulent or granulated dye preparations are provided which contain (1) an organic dye, (2) a non-ionic compound having a hydrotropic action and at least one of the components (3) or (4), component (3) being a reaction product of a fatty acid having 8 to 22 carbon atoms and 1 to 2 mols of diethanolamine and component (4) being a compound of the formula

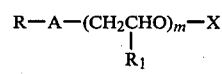

in which R is an aliphatic hydrocarbon radical having 8 to 22 carbon atoms or a cycloaliphatic, aromatic or aliphatic-aromatic hydrocarbon radical having 10 to 22 carbon atoms, $R_1$ is hydrogen or methyl, A is —O— or

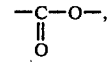

X is the acid radical of an inorganic, oxygen-containing acid, the acid radical of a polybasic carboxylic acid or a carboxyalkyl radical and m is a number from 1 to 50, and (5) optionally further customary additives.

The dye preparations are non-dusting, can be wetted easily and possess an increased dissolving ability so that they significantly facilitate the manufacture of padding liquors, dyes baths and printing pastes useful for dyeing and printing textile and non-textile substrates.

27 Claims, No Drawings

NON-DUSTY PULVERULENT AND GRANULATED ORGANIC DYE PREPARATIONS

This is a continuation of application Ser. No. 870,900, filed on Jan. 19, 1978, now abandoned.

The present invention relates to pulverulent or granulated dye preparations of organic dyes, which contain (1) organic dyes, (2) non-ionic compounds having a hydrotropic action and at least one of the components (3) or (4), component (3) being a reaction product of a fatty acid having 8 to 22 carbon atoms and 1 to 2 mols of diethanolamine and component (4) being a compound of the formula $$R-A-(CH_2CHO)_m-X \quad (1)$$
$$\phantom{R-A-(CH_2C}|$$
$$\phantom{R-A-(CH_2CHO)}R_1$$

in which R is an aliphatic hydrocarbon radical having 8 to 22 carbon atoms or a cycloaliphatic, aromatic or aliphatic-aromatic hydrocarbon radical having 10 to 22 carbon atoms, $R_1$ is hydrogen or methyl, A is —O— or

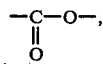

X is the acid radical of an inorganic, oxygen-containing acid, the acid radical of a polybasic carboxylic acid or a carboxyalkyl radical and m is a number from 1 to 50, and (5), optionally, customary formulating agents and anti-dusting agents.

The invention also relates to a process for the manufacture of the pulverulent or granulated dye preparations and to their use for the preparation of padding liquors, dye baths or printing pastes, which preferably are used for dyeing and printing textile and non-textile substrates. The textile substrates can be fibre materials of natural or synthetic origin, for example wool, cotton, polyamides, polyesters, polyacrylonitriles and, optionally, mixtures thereof, it being possible for these fibre materials to be in any desired stages of processing. Non-textile substrates are, for example, leather and paper.

The organic dyes can be insoluble in water or soluble in water, the latter being preferred.

Dyes which can be used are, for example, substantive dyes, acid and basic dyes, disperse dyes, chroming, developing and mordant dyes and also reactive dyes. The dyes are preferably metal-free or metal-containing and metallisable mono-, bis- and poly-azo dyes, which also include the formazan dyes, and also anthraquinone, nitro, methine, acid triphenylmethane, xanthone, naphthazarine, quinophthalone and phthalocyanine dyes.

A large proportion of these dyes is mentioned in the Colour Index, parts 1 to 3.

Metal complex dyes which can be used are, for example, 1:1 or 1:2 metal complexes of azo or azomethine dyes or metallised phthalocyanines, especially copper phthalocyanines and nickel phthalocyanines. The 1:1 and 1:2 metal complexes are preferably 1:1 nickel complexes, 1:1 copper complexes, 1:1 chromium complexes or symmetrical or asymmetrical 1:2 cobalt complexes or 1:2 chromium complexes of, especially, o-carboxy-o'-hydroxy-, o-hydroxy-o'-amino- or o,o'-dihydroxy-azo dyes of the benzene-azo-benzene, naphthalene-azo-naphthalene, benzene-azo-naphthalene, benzene-azo-pyrazolone, benzene-azo-pyridone or benzene-azoacetoacetic acid amide type, it being possible for these groupings to be unsubstituted or substituted. Possible substituents are, for example: carboxyl, sulphonic acid, substituted or unsubstituted sulphonamides or sulphones, halogen or nitro.

The dyes can be mono-, dis- or poly-azo dyes and these can also be in the form of salts of amines, for example of rhodamine B or isopropylamine or of methyl-branched alkylamines having, for example, 5 to 21 carbon atoms $$(CH_3)_2CHCH_2[(CH_3)_2CCH_2]_{0-4}CH_2NH_2$$

The copper phthalocyanines and nickel phthalocyanines used according to the invention are derived from the customary mixtures of different degrees of sulphonation and contain, preferably, 2 to 3 or also 4 sulphated sulphonic acid $\beta$-hydroxy-alkylamide groups or sulphonic acid $\gamma$-hydroxy-alkylamide groups, but in addition can also contain single halogens and single sulphonamide groups, and these sulphonamide groups can be unsubstituted or substituted on the nitrogen, for example by lower alkyl, such as methyl, ethyl, propyl or butyl, or lower hydroxyalkyl groups, such as 2-hydroxyethyl, 2-hydroxypropyl or 3-hydroxypropyl.

Particularly suitable reactive dyes are those which are derived from azo, anthraquinone or phthalocyanine dyes.

Direct dyes which can be used are, in particular, mono-, dis- and poly-azo dyes, which can also contain a metal, preferably copper, bonded as a complex, azoxy dyes or sulphonated copper phthalocyanines. Acid dyes are preferably acid azo or anthraquinone dyes.

The dyes used as disperse dyes which can be used according to the invention are as a rule mono- and dis-azo dyes and anthraquinone, naphthoperinone, quinophthalone and methine dyes, including the styryl, azamethine and azostyryl dyes; metal complex dyes of dyes of the azo and formazan type can also be used.

The dyes can, if desired, also be in the form of mixtures with one another or, if desired, with dyes of a different type.

Suitable non-ionic compounds, having a hydrotropic action, of component (2) are, for example, reaction products, having a molecular weight of about 2,000 to 7,000, of ($a_1$) monohydric to hexahydric aliphatic alcohols having 1 to 6 carbon atoms, monoalkyl- or monoalkylol-monoamines or polyalkylenepolyamines and ($a_2$) 1,2-propylene oxide, reaction products of alkylene oxides and a water-insoluble aliphatic monoalcohol having at least 8 carbon atoms, reaction products of alkylene oxides and aryl- or alkyl-phenols, reaction products of saturated dicarboxylic acids having 3 to 10 carbon atoms and 1,2-propylene oxide or polypropylene glycols, reaction products of fatty acids having 10 to 18 carbon atoms and 1,2-propylene oxide or polypropylene glycols, reaction products of fatty acids having 10 to 18 carbon atoms, trihydric to hexahydric alcohols and 1,2-propylene oxide or reaction products of fatty acids having 10 to 18 carbon atoms, polyalkylenepolyamines and 1,2-propylene oxide.

The reaction products of ($a_1$) and ($a_2$) can have molecular weights of, in particular, 2,000 to 6,000 and preferably of about 2,000 to 4,000. As a rule, these reaction products are obtained by adding about 30 to 120 mols of 1,2-propylene oxide onto 1 mol of a monohydric to hexahydric aliphatic alcohol having 1 to 6 carbon atoms, of a monoalkyl- or monoalkylol-monoamine or of a polyalkylene-polyamine.

Examples of the monohydric to hexahydric alcohols are methyl alcohol, ethyl alcohol, propyl alcohol or butyl alcohol, ethylene glycol, di- and tri-ethylene glycol, propylene glycol, dipropylene glycol, propane-1,3-diol, butane-1,2-, -1,3-, -1,4- and -2,3-diol, glycerol, trimethylolethane and trimethylolpropane, hexane-1,2,5- and -1,2,6-triol, 3-hydroxymethylpentane-2,4-diol, erythritol, pentaerythritol, dipentaerythritol, mannitol or sorbitol.

Dihydric to hexahydric alcohols having 2 to 6 carbon atoms are preferred, such as ethylene glycol, propylene glycol, glycerol, pentaerythritol, sorbitol, trimethylolethane and trimethylolpropane, and propylene glycol is particularly preferred.

The monoalkylmonoamines can contain 1 to 18, especially 1 to 6 and preferably 2 to 4, carbon atoms and are, for example, ethylamine, propylamine, octylamine, decylamine, dodecylamine, hexadecylamine or octadecylamine.

The monoalkylolmonoamines are as a rule those having 1 to 6, and preferably 2 to 4, carbon atoms, for example ethanolamine, propanolamine, isopropanolamine or butanolamine.

The polyalkylenepolyamines preferably have the formula $$H_2N(CH_2CH_2NH)_rCH_2CH_2NH_2 \quad (2)$$

in which r is 0 or a number from 1 to 3.

The majority of the compounds of component (2) are known commercially available products. Individual products are 1,2-propylene oxide adducts with the following alcohols, monoamines and polyamines. The preferred average molecular weight is indicated in brackets. Ethylene glycol (2,000), propylene glycol (2,000) and (2,700), glycerol (3,000), (3,100) and (4,000), trimethylpropane (2,500), (3,200), (4,000) and (6,300), ethylenediamine (3,600), monoisopropanolamine (2,300) and also trimethylolpropane/1,2-propylene oxide/ethylene oxide (3,700).

Reaction products of an alkylene oxide and water-insoluble aliphatic monoalcohols having at least 8 carbon atoms, such as, say, the reaction products of 1,2-propylene oxide, for example those which contain 1 to 30 mols of added 1,2-propylene oxide, but especially reaction products of ethylene oxide with these alcohols, in which products about 1 to 80 mols of ethylene oxide can be added on, are also suitable as component (2).

The alcohols can preferably contain 8 to 18 carbon atoms; they can be saturated or unsaturated, branched or straight-chain and can be employed on their own or as a mixture.

Naturally occurring alcohols, for example myristyl alcohol, cetyl alcohol, stearyl alcohol or oleyl alcohol, or synthetic alcohols, such as, in particular, 2-ethylhexanol and also triethylhexanol, trimethylnonyl alcohol or the Alfols (tradename—Continental Oil Company) can be used. The Alfols are linear primary alcohols.

The number behind the name indicates the average number of carbon atoms in the alcohol; thus, for example, Alfol (1218) is a mixture of decyl alcohol, dodecyl alcohol, tetradecyl alcohol, hexadecyl alcohol and octadecyl alcohol.

Further representatives are Alfol (810), (12), (16) and (18).

Preferred ethylene oxide reaction products can be represented, for example, by the following formula $$R_3O(CH_2CH_2O)_sH \quad (3)$$

in which $R_3$ is a saturated or unsaturated hydrocarbon radical, preferably an alkyl radical, having 8 to 18 carbon atoms and s is a number from 1 to 10. If s is a number from 1 to 3, the reaction products are as a rule water-insoluble, whilst the reaction products containing a larger number of ethylene oxide units are soluble in water. Examples of these products are the reaction products of, in particular, 2-ethylhexanol and also of lauryl alcohol, tridecyl alcohol, hexadecyl alcohol and stearyl alcohol with ethylene oxide.

Component (2) can also be a reaction product, which is sparingly soluble in water, of ethylene oxide and/or 1,2-propylene oxide and an alkylphenol having 4 to 12 carbon atoms in the alkyl moiety. These compounds preferably have the formula

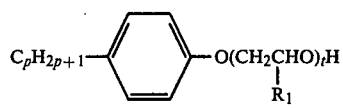

in which $R_1$ is hydrogen or methyl, p is a number from 4 to 12, preferably 8 to 9, and t is a number from 1 to 60, especially from 1 to 30 and preferably 1 to 3.

Individual octyl- and nonyl-phenol reaction products are those which follow: p-nonylphenol/30 mols propylene oxide; p-octylphenol/2 mols of ethylene oxide; p-nonylphenol/3 mols of ethylene oxide; and p-nonylphenol/60 mols of 1,2-propylene oxide.

The arylphenol/alkylene oxide adducts are, in particular, o-phenylphenol/ethylene oxide adducts. The number of ethylene oxide units can be about 1 to 20 and preferably 2 to 10.

Reaction products of a saturated dicarboxylic acid having 3 to 10, and especially 6 to 10, carbon atoms and 1,2-propylene oxide or a polypropylene glycol are also suitable as component (2). Dicarboxylic acids which can be used are, for example, malonic acid, succinic acid, glutaric acid, adipic acid, pimelic acid, suberic acid, azelaic acid or sebacic acid. Adipic acid and sebacic acid are preferred. The number of 1,2-propylene oxide units in the reaction products can be about 2 to 40. Finally, reaction products of a fatty acid having 10 to 18 carbon atoms and 1,2-propylene oxide or a polypropylene glycol can also be employed. The fatty acids can be saturated or unsaturated, for example capric acid, lauric acid, myristic acid, palmitic acid or stearic acid or decenoic acid, dodecenoic acid, tetradecenoic acid, hexadecenoic acid, oleic acid, linoleic acid, linolenic acid or ricinoleic acid. The number of 1,2-propylene oxide units in these esters can be about the same as that in the abovementioned reaction products.

Further reaction products which are suitable as component (2) are obtained from the abovementioned fatty acids having 10 to 18 carbon atoms, trihydric to hexahydric alcohols or polyalkylenepolyamines and 1,2-propylene oxide.

The trihydric to hexahydric alcohols preferably contain 3 to 6 carbon atoms and are, in particular, glycerol, trimethylolpropane, pentaerythritol and sorbitol. The polyalkylenepolyamines can be represented by formula (2).

The reaction product of lauryl-sorbitol and 1,2-propylene oxide (molecular weight 2,500) and the reaction product of the polyaminoamide of the formula $$C_{11}H_{23}CONHCH_2CH_2NHCH_2CH_2NHCH_2CH_2NH_2 \quad (5)$$

(lauric acid/triethylenetetramine) and 1,2-propylene oxide (molecular weight 2,600) may be mentioned as examples.

All of the compounds and reaction products mentioned as component (2) are either known or, in some cases, obtainable commercially or can be prepared by known methods commonly used by those skilled in the art.

The fatty acids and, in some cases, also fatty acid derivatives, for example fatty acid alkyl esters, which are suitable for the preparation of the reaction products of component (3) can be saturated or unsaturated and substituted or unsubstituted. Individual fatty acids are those which follow: caprylic acid, capric acid, lauric acid, myristic acid, palmitic acid, stearic acid, arachic acid, behenic acid, coconut fatty acid ($C_8$–$C_{18}$), decenoic acid, dodecenoic acid, tetradecenoic acid, hexadecenoic acid, oleic acid, linoleic acid, linolenic acid, ricinoleic acid, eicosenoic acid, docosenoic acid or clupanodonic acid.

Reaction products of lauric acid, stearic acid, oleic acid and especially coconut fatty acid and 1 to 2 mols, especially 2 mols, of diethanolamine are preferred. If desired, mixtures of the reaction products of component (3) can also be employed.

The compounds of component (4) are anionic compounds. The radical R—A— in the compounds of the formula (1) is derived, for example, from higher alcohols, such as decyl alcohol, lauryl alcohol, tridecyl alcohol, myristyl alcohol, cetyl alcohol, stearyl alcohol, oleyl alcohol, arachidyl alcohol or behenyl alcohol; and also from alicyclic alcohols, such as hydroabietyl alcohol; from fatty acids, such as caprylic acid, capric acid, lauric acid, myristic acid, palmitic acid, stearic acid, arachic acid, behenic acid, coconut fatty acid ($C_8$–$C_{18}$), decenoic acid, dodecenoic acid, tetradecenoic acid, hexadecenoic acid, oleic acid, linoleic acid, linolenic acid, eicosenoic acid, docosenoic acid or clupanodonic acid; from alkylphenols, such as butyl-, hexyl-, n-octyl-, n-nonyl-, p-tert.-nonyl-, decyl-, dodecyl-, tetradecyl- or hexadecylphenol, or from arylphenols, such as o- or p-phenylphenols. Radicals having 10 to 18 carbon atoms and especially those which are derived from the alkylphenols are preferred.

The acid radical X is as a rule the acid radical of a polybasic, in particular low-molecular, mono- or di-carboxylic acid, for example of maleic acid, malonic acid, succinic acid or sulphosuccinic acid, or a carboxyalkyl radical, especially a carboxymethyl radical (derived from, for example, chloroacetic acid) and is bonded via an ether or ester bridge to the radical R—A—($CH_2CHR_1O$)$_m$—. In particular, however, X is derived from inorganic polybasic acids, such as orthophosphoric acid and sulphuric acid. The acid radical X is preferably in the form of a salt, i.e., for example, in the form of an alkali metal salt, ammonium salt or amine salt. Examples of such salts are sodium, calcium, ammonium, trimethylamine, ethanolamine, diethanolamine or triethanolamine salts. The alkylene oxide units ($CH_2CHR_1O$)— in formula (1) are as a rule ethylene oxide and 1,2-propylene oxide units; the latter are preferably mixed with ethylene oxide units in the compounds of the formula (1).

These compounds are prepared by known methods by adding ethylene oxide, or alternately ethylene oxide and 1,2-propylene oxide in any order, onto the said alcohols, acids and alkylphenols and subsequently esterifying the adduct and, if desired, converting the esters into their salts. The compounds of component (4) are known, for example from U.S. Pat. No. 3,211,514. Preferred compounds of the formula (1) are those which have the formulae $$R-A-(CH_2CH_2O)_{m_1}-(CH_2CHO)_{m_2}-(CH_2CH_2O)_{m_3}-X \quad (6)$$
$$\phantom{R-A-(CH_2CH_2O)_{m_1}-(}CH_3$$

and especially $$R-A-(CH_2CH_2O)_n-X \quad (7)$$

in which R, A and X are as defined, the sum of $m_1$, $m_2$ and $m_3$ is 2 to 20, the ratio of ethylene oxide groups to propylene oxide groups in compounds of the formula (6) is 1:(1 to 2), preferably 1:1, and n is a number from 1 to 9, preferably 1 to 5 or 1 to 4.

Further compounds of particular interest are the anionic compounds of the formula $$R_2O(CH_2CH_2O)_n-X \quad (8)$$

in which $R_2$ is a saturated or unsaturated hydrocarbon radical, o-phenylphenyl or alkylphenyl having 4 to 12 carbon atoms in the alkyl moiety and X and n are as defined.

Amongst the compounds which are derived from alkylphenol/ethylene oxide adducts, those of the formulae

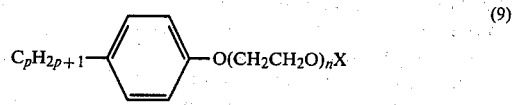

(9)

and

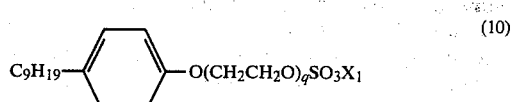

(10)

in which p is a number from 4 to 12, q is a number from 1 to 3 and $X_1$ is H, $NH_4^{\oplus}$ or an alkali metal cation and X and n are as defined, are also particularly preferred. At least one compound of component (4), and in some cases a mixture of the said compounds, is employed.

The customary formulating agents (5), which can be used if desired, can be, for example, inorganic salts, such as sodium chloride, sodium sulphate, sodium bisulphate, sodium carbonate or mono-, di- and tri-sodium phosphate, and also sodium benzenesulphonate, ligninsulphonates, dinaphthylmethanedisulphonates or their derivatives, sugars, dextrin or urea and also ethylene oxide adducts of fatty amines or polyalkylenepolyamines which can contain aliphatic or aromatic substituents on the nitrogen atoms.

The pulverulent or granulated dye preparations according to the invention can contain, as further additives, foam-control assistants, for example silicone oils, and also substances which inhibit fungal and/or bacterial growth and, if desired, in addition also anti-dusting agents, for example paraffin oil and mineral oils, which can be emulsified with suitable emulsifiers, for example fatty acid (fatty alcohol)/ethylene oxide adducts.

As a rule, the preparations according to the invention contain, in addition to the organic dye, 1 to 20 percent by weight of a mixture of component (2) and at least one of components (3) and (4) and, optionally, 1.5 to 60 percent by weight of conventional formulating agents of component (5), the percentages being based on the total preparation in each case.

Those preparations which, in addition to the organic dye, contain 1 to 20, and preferably 1 to 10, percent by weight of a mixture of component (2) and at least one of components (3) and (4) are particularly suitable.

The weight ratio of component (2) to component (3) or (4) or to the two components can be preferably about 2:1 to 1:5 and preferentially about 2:1 to 1:3, whilst the ratio of components (3) and (4) to one another—when they are employed together—can be 4:1 to 1:2 and preferably 2:1 to 1:1.

The dye content of the pulverulent preparations can vary between 40 and 99 percent by weight, based on the total preparation.

The pulverulent dye preparations can be prepared by drying dye press-cakes containing water or organic solvents, for example at temperatures of 20° to 300° C. and if appropriate also at higher temperatures or lower temperatures and if appropriate in vacuo (for example freeze drying), aqueous preparations which contain component (2), at least one of components (3) and (4) and also, if desired, further conventional additives, for example anti-foams based on silicone oil being added or sprayed direct onto these press-cakes before and/or during drying and, if desired, subsequently grinding dry.

A further possibility for the manufacture of the pulverulent dye preparations consists in converting the said dye press-cakes into dye suspensions by adding water and, if desired, solvents and then drying, for example spray-drying, the suspensions, the said aqueous preparations being added direct to the suspensions before drying. Furthermore, it is also possible to add the aqueous preparations to the aqueous or organic reaction mixture (the reaction solution) obtained at the end of the dye synthesis, to dry the resulting mixture as indicated and subsequently, optionally, to grind dry.

If the dye is already pulverulent or granulated, it can also be sprayed, in this form, with aqueous preparations which contain component (2), at least one of components (3) and (4) and also, optionally, further customary additives, for example anti-foams based on silicone oil, and mixed, for example in conventional kneaders or mixers, and subsequently dried if appropriate. Drying can be effected, for example, at 20° to 300° C., in vacuo if appropriate.

The pulverulent or granulated dye preparations thus obtained are non-dusting, can be wetted well and possess an increased dissolving ability (short time for redissolving), so that they significantly facilitate the manufacture of padding liquors, dye baths and printing pastes, useful for dyeing and printing of textile and non-textile substrates. Neither lengthy stirring processes nor elevated temperatures (the dye preparations are soluble in cold water) are necessary in order to obtain the said liquid dyeing preparations (by dissolving and/or mixing the preparations with water and/or organic solvents in a homogeneous form. The liquid dyeing preparations are very stable both in the concentrated form (short liquors) and also when extensively diluted with water and/or solvents.

Dye precipitates, which can considerably impair the dyeing or printing process, are not observed.

The dyes, which are introduced into the dyeing preparations in the form of the pulverulent or granulated preparations according to the invention, also have markedly improved exhaustion characteristics since they are absorbed virtually completely and levelly on the substrates.

In the following examples the parts and percentages are by weight. Suitable reaction products for components (2), (3) and (4) are first indicated below.

Component (2)

$B_1$ Ethylene glycol/1,2-propylene oxide reaction product molecular weight 2,000

$B_2$ Propylene glycol/1,2-propylene oxide reaction product molecular weight 2,000

$B_3$ Propylene glycol/1,2-propylene oxide reaction product molecular weight 2,700

$B_4$ Glycerol/1,2-propylene oxide reaction product molecular weight 3,000

$B_5$ Glycerol/1,2-propylene oxide reaction product molecular weight 3,100

$B_6$ Glycerol/1,2-propylene oxide reaction product molecular weight 4,000

$B_7$ Trimethylolpropane/1,2-propylene oxide reaction product molecular weight 2,500

$B_8$ trimethylolpropane/1,2-propylene oxide reaction product molecular weight 3,200

$B_9$ Trimethylolpropane/1,2-propylene oxide reaction product molecular weight 4,000

$B_{10}$ Trimethylolpropane/1,2-propylene oxide reaction product molecular weight 6,300

$B_{11}$ Ethylenediamine/1,2-propylene oxide reaction product molecular weight 3,600

$B_{12}$ Monoisopropanolamine/1,2-propylene oxide reaction product molecular weight 2,300

$B_{13}$ Methanol (or 1-methoxy-2-propanol)/1,2-propylene oxide reaction product, molecular weight 2,750

$B_{14}$ Butanol/1,2-propylene oxide reaction product molecular weight 3,000

$B_{15}$ Sorbitol/1,2-propylene oxide reaction product molecular weight 2,650

$B_{16}$ Pentaerythritol/1,2-propylene oxide reaction product molecular weight 3,000

$B_{17}$ Methylethanolamine/1,2-propylene oxide reaction product molecular weight 3,000

$B_{18}$ Hexylamine/1,2-propylene oxide reaction product molecular weight 3,000

$B_{19}$ Triethanolamine/1,2-propylene oxide reaction product molecular weight 3,650

$B_{20}$ Triethylenetetramine/1,2-propylene oxide reaction product molecular weight 3,050

$B_{21}$ Dipropylenetriamine/1,2-propylene oxide reaction product molecular weight 3,500

$B_{22}$ Adduct of 30 mols of propylene oxide and 1 mol of nonylphenol $B_{23}$ Reaction product of 3 mols of ethylene oxide and 1 mol of nonylphenol $B_{24}$ Reaction product of 2 mols of ethylene oxide and 1 mol of nonylphenol $B_{25}$ Reaction product of 1 mol of ethylene oxide and 1 mol of 2-ethylhexanol B$_{26}$ Reaction product of 3 mols of ethylene oxide and 1 mol of stearyl alcohol B$_{27}$ Reaction product of 1 mol of ethylene oxide and 1 mol of butylphenol B$_{28}$ Reaction product of 10 mols of propylene oxide and 1 mol of dodecylphenol B$_{29}$ Reaction product of 5 mols of ethylene oxide and 1 mol of 2-ethylhexanol B$_{30}$ Reaction product of 8 mols of ethylene oxide and 1 mol of o-phenylphenol B$_{31}$ Reaction product of 3 mols of ethylene oxide and 1 mol of tridecyl alcohol B$_{32}$ Reaction product of 3 mols of ethylene oxide and 1 mol of hexadecyl alcohol B$_{33}$ Reaction product of 2 mols of ethylene oxide and 1 mol of lauryl alcohol B$_{34}$ Reaction product of 10 mols of ethylene oxide and 1 mol of 2-ethylhexanol B$_{35}$ Reaction product of 1,2-propylene oxide and 1 mol of oleyl alcohol (molecular weight 2,000)

B$_{36}$ Reaction product of 60 mols of 1,2-propylene oxide and 1 mol of p-nonylphenol (molecular weight 3,700)

B$_{37}$ Reaction product of 1 mol of polypropylene glycol (molecular weight 2,000) and 1 mol of oleic acid B$_{38}$ Reaction product of 2 mols of polypropylene glycol (molecular weight 1,000) and 1 mol of adipic acid B$_{39}$ Reaction product of 1,2-propylene oxide and 1 mol of lauryl sorbitane ester (molecular weight 2,500)

B$_{40}$ Reaction product of propylene oxide and 1 mol of a polyaminoamide of the formula

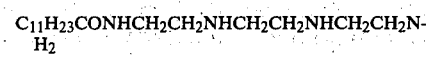
$C_{11}H_{23}CONHCH_2CH_2NHCH_2CH_2NHCH_2CH_2NH_2$ (molecular weight 2,600)

B$_{41}$ Reaction product of 1 mol of tributylphenol and 5 mols of ethylene oxide B$_{42}$ Reaction product of 1 mol of nonylphenol and 6 mols of ethylene oxide B$_{43}$ Reaction product of 1 mol of octylphenol and 4 mols of ethylene oxide B$_{44}$ Reaction product of 1 mol of oleyl alcohol and 80 mols of ethylene oxide.

Component (3)

C$_1$ Reaction product of coconut fatty acid and 2 mols of diethanolamine

C$_2$ Reaction product of stearic acid and 2 mols of diethanolamine

C$_3$ Reaction product of oleic acid and 2 mols of diethanolamine

C$_4$ Reaction product of methyl laurate and 1 to 2 mols of diethanolamine.

Anionic compounds (component 4)

D$_1$ The ammonium salt of the acid sulphuric acid ester of the adduct of 2 mols of ethylene oxide and 1 mol of p-tert.-nonylphenol;

D$_2$ The ammonium salt of the acid sulphuric acid ester of the adduct of 3 mols of ethylene oxide and 1 mol of tridecyl alcohol;

D$_3$ The sodium salt of the acid maleic acid ester of the adduct of 2 mols of ethylene oxide and 1 mol of p-nonylphenol;

D$_4$ The ammonium salt of the acid sulphuric acid ester of the adduct of 3 mols of ethylene oxide and 1 mol of p-butylphenol;

D$_5$ The ammonium salt of the acid phosphoric acid ester of the adduct of 2 mols of ethylene oxide and 1 mol of p-nonylphenol;

D$_6$ The sodium salt of the carboxymethyl ether of the adduct of 4 mols of ethylene oxide and 1 mol of p-octylphenol;

D$_7$ The sodium salt of the di-sulphosuccinic acid ester of the adduct of 4 mols of ethylene oxide and 1 mol of p-octylphenol;

D$_8$ The ammonium salt of the acid sulphuric acid ester of coconut fatty acid diglycol;

D$_9$ The ammonium salt of the acid sulphuric acid ester of the adduct of 1 mol of ethylene oxide and 1 mol of stearyl alcohol;

D$_{10}$ The ammonium salt of the acid sulphuric acid ester of the adduct of 9 mols of ethylene oxide and 1 mol of p-nonylphenol;

D$_{11}$ The ammonium salt of the acid sulphuric acid ester of the adduct of 6 mols of ethylene oxide and 1 mol of p-nonylphenol;

D$_{12}$ The sodium salt of the monosulphosuccinic acid ester of the adduct of 2 mols of ethylene oxide and 1 mol of p-nonylphenol;

D$_{13}$ The ammonium salt of the acid sulphuric acid ester of the adduct of 1 mol of propylene oxide and 1 mol of ethylene oxide and 1 mol of nonylphenol;

D$_{14}$ The ammonium salt of the acid sulphuric acid ester of the adduct of 10 mols of propylene oxide and 10 mols of ethylene oxide and 1 mol of nonylphenol;

D$_{15}$ The ammonium salt of the acid sulphuric acid ester of the adduct of 6 mols of ethylene oxide and 1 mol of dodecylphenol;

D$_{16}$ The ammonium salt of the acid sulphuric acid ester of the adduct of 6 mols of ethylene oxide and 1 mol of pentadecylphenol;

D$_{17}$ The ammonium salt of the acid sulphuric acid ester of the adduct of 5 mols of ethylene oxide and 1 mol of tributylphenol;

D$_{18}$ The ammonium salt of the acid sulphuric acid ester of the adduct of 3 mols of ethylene oxide and 1 mol of Alfol (2022);

D$_{19}$ The ammonium salt of the acid sulphuric acid ester of the adduct of 2 mols of ethylene oxide and 1 mol of hydroabietyl alcohol;

D$_{20}$ The ammonium salt of the acid sulphuric acid ester of the adduct of 2 mols of ethylene oxide and 1 mol of octylphenol;

D$_{21}$ The ammonium salt of the acid sulphuric acid ester of the adduct of 50 mols of ethylene oxide and 1 mol of nonylphenol;

D$_{22}$ The ammonium salt of the acid sulphuric acid ester of the adduct of 35 mols of ethylene oxide and 1 mol of nonylphenol;

D$_{23}$ The ammonium salt of the acid sulphuric acid ester of the adduct of 15 mols of propylene oxide and 1 mol of nonylphenol;

D$_{24}$ The ammonium salt of the acid sulphuric acid ester of the adduct of 8 mols of ethylene oxide and 1 mol of o-phenylphenol;

D$_{25}$ The ammonium salt of the acid sulphuric acid ester of the adduct of 1 mol of ethylene oxide and 1 mol of 2-ethylhexanol;

D$_{26}$ The ammonium salt of the acid sulphuric acid ester of the adduct of 2 mols of ethylene oxide and 1 mol of coconut fatty acid;

D$_{27}$ The ammonium salt of the acid sulphuric acid ester of the adduct of 2 mols of propylene oxide and 1 mol of coconut fatty acid.

EXAMPLE 1

(a) 85.7 parts of the dye of the formula

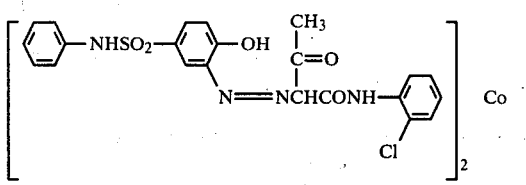
(101)

and 2.3 parts of dextrin are premixed in a mixer. 3 parts of an aqueous preparation having the following composition: 25 parts of $B_{30}$, 25 parts of $C_1$ and 50 parts of water, and then 4 parts of an emulsified paraffin oil (emulsifier: a mixture of an oleic acid/polyethylene glycol adduct and an octylphenol/ethylene oxide adduct) are then injected and mixing is continued for a further 5 minutes at room temperature. This gives a low-dust pulverulent dye preparation (rating 4) which can be wetted well and has a markedly improved solubility when preparing aqueous dye liquors. The rating 4 is maintained even after storage of the dye preparation for one week at 50° C.

The untreated pulverulent dye has dust characteristics which are evaluated as rating 1.

The following dust test is carried out in order to determine the dust characteristics:

A metal funnel having an internal diameter of 10 cm and a tube (internal diameter 15 mm) are placed on a metal cylinder having a capacity of 500 ccm, the lower end of the tube reaching down to the 200 ccm level of the cylinder. A perforated round filter paper (Schleicher and Schüll LS14) which has been moistened with water so that the filter paper is only moderately damp but not dripping wet, is fastened at the 400 ccm height in the cylinder. 10 g of the substance to be tested are then poured in rapidly through the funnel and after waiting for 3 minutes the funnel is withdrawn and the round filter paper is removed by cutting through. The filter paper is then evaluated by means of a 5-stage assessment scale, as follows:

Rating 1 = severe dusting, when the round filter paper is highly shaded to intensely coloured;

Rating 2 = considerable dusting, when the round filter paper is slightly shaded;

Rating 3 = moderate dusting, when there are a large number of coloured spots, some of which touch one another, on the round filter paper;

Rating 4 = slight dusting, when there are spots of dye but no connected spots of colour on the round filter paper; and Rating 5 = low-dust, when the round filter paper shows a barely visible staining or at most isolated spots of dye.

Further dye preparations having the compositions indicated below are prepared by the method described under (a) and the following results are obtained:

(The dust ratings were determined as in (a). The 3 figures give the dust ratings immediately after preparation, after one week at 20° C. and after one week at 50° C.

Without the addition of the preparations according to the invention, the dye preparations have only inadequate dust characteristics (Rating 1). The solubility given is the solubility in water).

(b) 92.0 parts of the dye of the formula

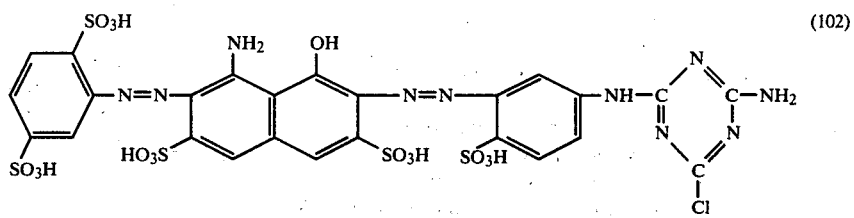
(102)

3 parts of an emulsified paraffin oil (emulsifier as in (a)) and 5 parts of an aqueous preparation which contains 42.7 parts of $B_{30}$, 42.7 parts of $D_1$ (40% strength, aqueous), 0.4 part of a silicone anti-foam and 14.2 parts of water.

Dust test: Rating 5/5/5
Solubility: 100 g/l at 30° C.

(c) 92.0 parts of the dye of the formula (102), 3.0 parts of an emulsified paraffin oil (emulsifier as in (a)) and 5 parts of an aqueous preparation which contains 21.4 parts of $B_{29}$, 50 parts of $D_1$ (40% strength, aqueous) and 28.6 parts of water.

Dust test: Rating 5/4-5/4-5
Solubility: 100 g/l at 30° C.

(d) 82 parts of the 1:2 chromium complex of the dyes

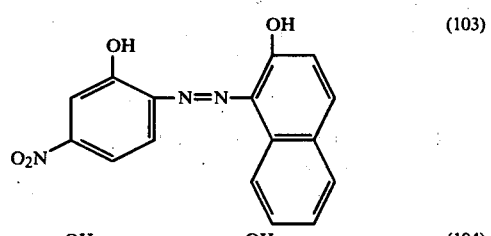
(103)

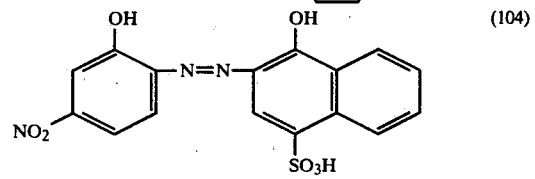
(104)

9.1 parts of sodium sulphate, 1.9 parts of an emulsified paraffin oil (25% strength, aqueous, emulsifier as in (a)) and 7.0 parts of an aqueous preparation which contains 25 parts of $B_{30}$, 25 parts of $C_1$ and 50 parts of water.

Dust test: Rating 5/5/5
Solubility: 60 g/l (at 30° and 60° C.).

(e) 82.0 parts of the 1:2 chromium complex of the dye of the formulae (103) and (104), 9.1 parts of sodium sulphate, 1.9 parts of an emulsified paraffin oil as in (d) and 7.0 parts of a preparation which contains 8.4 parts of $B_{30}$, 25 parts of $C_1$, 16 parts of $D_1$, 16.6 parts of tributyl phosphate and 33.4 parts of ethylene glycol monoethyl ether.

Dust test: Rating 5/5/4

Solubility: 60 g/l (at 30° and 60° C.).

(f) 76.0 parts of the copper phthalocyanine dye of the formula

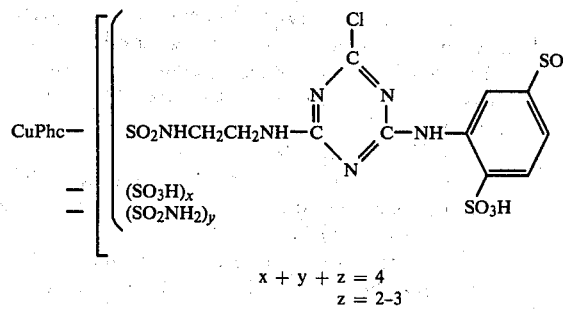

(105)

$$x + y + z = 4$$
$$z = 2-3$$

15.2 parts of a naphthalenesulphonic acid/formaldehyde condensation product, 3.8 parts of an emulsified paraffin oil as in (d) and 5.0 parts of the aqueous preparation as in (b).

Dust test: Rating 5/5/5

Solubility: 100 g/l (60° C.).

(g) 76.0 parts of the dye of the formula (105), 15.2 parts of a naphthalenesulphonic acid/formaldehyde condensation product, 3.8 parts of an emulsified paraffin oil as in (d) and 5.0 parts of the aqueous preparation as in (c).

Dust test: Rating 5/5/4-5

Solubility: >100 g/l (60° C.).

(h) 76.0 parts of the dye of the formula (105), 15.2 parts of a naphthalenesulphonic acid/formaldehyde condensation product, 3.8 parts of an emulsified paraffin oil as in (d) and 5.0 parts of the aqueous preparation as in (d).

Dust test: Rating 5/4-5/4-5

Solubility: 100 g/l (60°).

(i) 82 parts of the dye of the formula

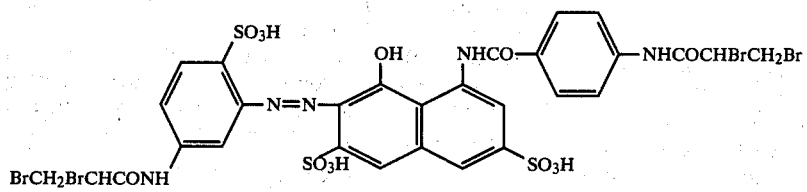

(106)

6 parts of dextrin, 5 parts of an emulsified paraffin oil as in (a) and 7 parts of the aqueous preparation as in (b).

Dust test: Rating 4-5/5/5

Solubility: 50 g/l at 30° C.; 80 g/l at 60° C.

(k) 82 parts of the dye of the formula (106), 6 parts of dextrin, 5 parts of an emulsified paraffin oil as in (a) and 7 parts of the preparation as in (e).

Dust test: Rating 4-5/4-5/4

(l) 82 parts of the dye of the formula (106), 6 parts of dextrin, 5 parts of an emulsified paraffin oil as in (a) and 7 parts of an aqueous preparation which contains 32 parts of $B_3$, 32 parts of $D_1$ (40% strength, aqueous) and 36 parts of water.

Dust test: Rating 4-5/4/3-4

(m) 72 parts of the dye of the formula

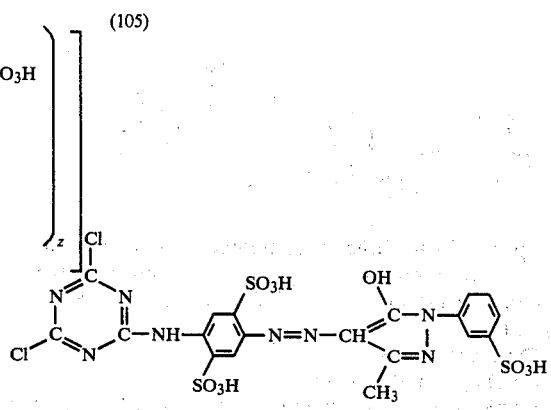

(107)

20 parts of a naphthalenesulphonic acid/formaldehyde condensation product, 3 parts of an emulsified paraffin oil as in (a) and 4 parts of the aqueous preparation as in (b).

Dust test: Rating 5/5/4-5

Solubility: >100 g/l (n) 72 parts of the dye of the formula (107), 20 parts of a naphthalenesulphonic acid/formaldehyde condensation product, 3 parts of an emulsified paraffin oil as in (a) and 5 parts of the aqueous preparation as in (d).

Dust test: Rating 5/5/4-5

Solubility: >100 g/l (o) 66.7 parts of the dye of the formula

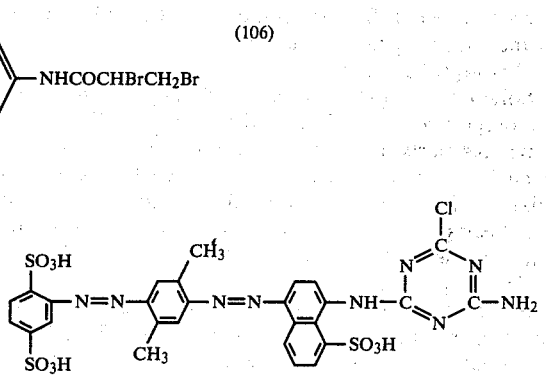

(108)

9 parts of sodium chloride, 9 parts of a naphthalenesulphonic acid/formaldehyde condensation product, 8.7 parts of the emulsified paraffin oil as in (a) and 6.6 parts of the aqueous preparation as in (d).

Dust test: Rating 4-5/4-5/4

Solubility: 100 g/l at 30° C. (without the addition of the aqueous preparation: 30 g/l)

(p) 66.7 parts of the dye of the formula (108), 9 parts of a naphthalenesulphonic acid/formaldehyde condensation product, 8.7 parts of the emulsified paraffin oil as in (a) and 6.6 parts of the aqueous preparation as in (b).

Dust test: Rating 4-5/4-5/4

Solubility: 100 g/l at 30° C. (without the addition of the aqueous preparation 30 g/l).

The padding liquors which are obtained using this dye preparation are very stable.

(q) 83.4 parts of the dye of the formula

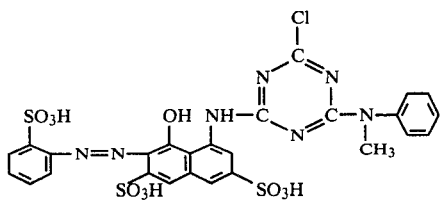
(109)

3.3 parts of a naphthalenesulphonic acid/formaldehyde condensation product, 5.0 parts of the emulsified paraffin oil as in (a) and 8.3 parts of the aqueous preparation as in (c).

Dust test: 3-4/3-4/3

Solubility: 100 g/l (60° C.).

(r) 83.4 parts of the dye of the formula (109), 3.3 parts of a naphthalenesulphonic acid/formaldehyde condensation product, 5.0 parts of the emulsified paraffin oil as in (a) and 8.3 parts of the aqueous preparation as in (b).

Dust test: 3-4/3-4/3

Solubility: 100 g/l (60° C.).

(s) 84.0 parts of the dye of the formula

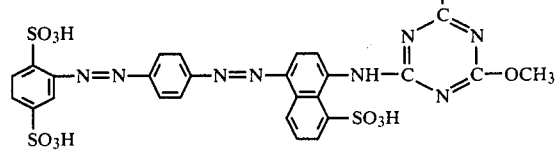
(110)

2.0 parts of sodium chloride, 2.0 parts of a naphthalenesulphonic acid/formaldehyde condensation product, 8 parts of an emulsified paraffin oil as in (a) and 4.0 parts of the aqueous preparation as in (d).

Dust test: Rating 5/5/5

Solubility: 60 g/l at 30° C. (without the addition of the preparation according to the invention: 30 g/l).

(t) 93.4 parts of the dye according to Example 1 of French Patent Specification 2,295,090, 1.9 parts of a mixture of 5 parts of the emulsified paraffin oil as in (a) and 3 parts of emulsified mineral oil, and 4.7 parts of the aqueous preparation as in (d).

Dust test: Ratings 4-5/4-5/4-5

Solubility: 60 g/l at 60° C. (without the addition of the preparation according to the invention: 30 g/l)

(u) 93.4 parts of the dye as in (t), 1.9 parts of the paraffin oil/mineral oil mixture as in (t) and 4.7 parts of the aqueous preparation as in (c).

Dust test: Ratings 5/5/4-5

Solubility: 60 g/l at 60° C. (without the addition of the preparation according to the invention: 30 g/l)

(v) 93.4 parts of the dye as in (t), 1.9 parts of the paraffin oil/mineral oil mixture as in (t) and 4.7 parts of the aqueous preparation as in (b).

Dust test: Ratings 5/5/5

Solubility: 60 g/l at 60° C. (without the addition of the preparation according to the invention: 30 g/l.

(w) 94.7 parts of the dye of the formula

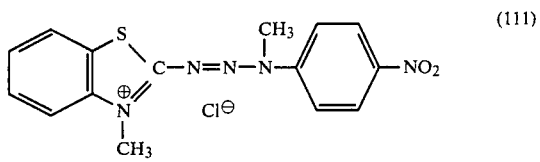
(111)

2.8 parts of a stearylethylenetriamine/styrene oxide/ethylene oxide adduct (50% strength, aqueous) and 2.5 parts of an aqueous preparation which contains 10 parts of $B_{30}$, 25 parts of $C_1$, 10 parts of $C_2$ and 55 parts of water.

Dust test: Rating 4/4/4

Solubility at 90° C.: 100 g/l (without the addition of the aqueous preparation, the dye powder has a solubility of only 40–50 g/l).

(x) 52.4 parts of the dye of the formula (111), 44.9 parts of sodium sulphate, 1.4 parts of the ethylene oxide adduct as in (w) and 1.3 parts of the aqueous preparation as in (w).

Dust test: Rating 4/4/4

Solubility:
(30° C.) 15 g/l (without the addition of the aqueous preparation: 10 g/l)
(60° C.) 30 g/l: 20 g/l
(100° C.) 100 g/l: 50 g/l (y) 90 parts of the dye of the formula

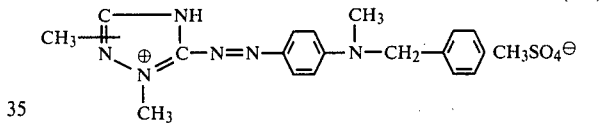
(112)

and 10 parts of the aqueous preparation as in (w).

Dust test: Rating 5/5/4

Solubility: 80 g/l (90° C.)

(z) 50 parts of the dye of the formula (112), 44.4 parts of sodium sulphate and 5.6 parts of the aqueous preparation as in (w).

Dust test: Rating 5/5/5

Solubility: 80 g/l (90° C.).

In place of the components B, C and D employed in the above dye preparations, it is also possible to employ the other components B, C and D mentioned in this specification, good results again being obtained.

EXAMPLE 2

4 g of the dye of the formula

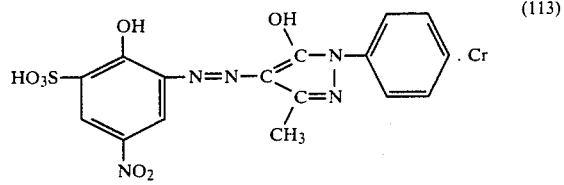
(113)

(in paste form) are mixed to a paste with 3 g of an aqueous preparation which contains 25 parts of $B_{30}$, 25 parts of $C_1$ and 50 parts of water and the resulting paste is then dissolved in 100 ml of water. The dye solution is then evaporated to dryness. This gives an orange-coloured dye powder which can be redissolved in water easily (good wettability) and completely (contains no undissolved constituents) and is outstandingly suitable for the preparation of dye liquors for textile materials, for example wool. When used to dye wool, a very good degree of exhaustion of the liquor and a level-dyed substrate are obtained.

In place of the dye of the formula (113), the dye of the formula

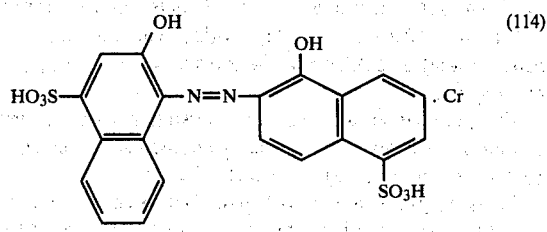
(114)

can also be employed. This gives a blue dye powder which has equally good properties for the preparation of dye liquors which are absorbed levelly and give a high degree of exhaustion.

In place of components $B_{30}$ and $C_1$, the other components B and C and also, if desired, D can also be employed, good results again being obtained.

EXAMPLE 3

10 g of the dye of the formula

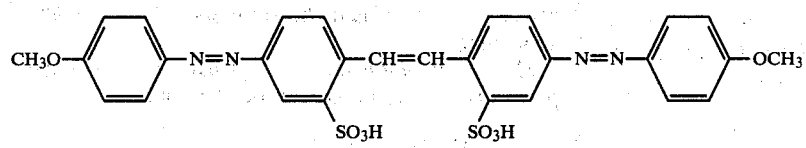
(115)

are boiled up in 250 g of water. 1 g of an aqueous preparation which contains 22.7 parts of $B_{30}$, 22.7 parts of $C_1$, 9.1 parts of a silicone anti-foam and 45.5 parts of water are added to the solution, which subsequently is evaporated to dryness.

If the yellow dye powder thus obtained is scattered onto cold water the powder is dissolved rapidly, whilst the same dye in the untreated form can virtually not be dissolved in cold water.

A heated dye solution (7.5 g/l) does not lead to the dye crystallising out on cooling. Untreated dye, however, precipitates out virtually completely under the same conditions. Moreover, the foaming of the dye solution is markedly reduced.

In place of the said preparation, a preparation consisting of 27.3 parts of $B_{44}$, 10 parts of $D_1$, 9.1 parts of a silicone anti-foam and 53.6 parts of water can be employed with an equally good result.

What is claimed is:

1. A non-dusting pulverulent or granulated dye preparation consisting essentially of
   (1) an organic dye which is a metal-free, metal-containing or metallizable mono-, bis- or polyazo dye or an athraquinone, nitro, methine, acid triphenylmethane, xanthone, naphthazarine, quinophthalone or phthalocyanine dye;
   1 to 20 percent by weight of a mixture of component (2) and at least one of components (3) or (4), wherein component
   (2) is a nonionic hydrotropic compound which is a reaction product adduct
   (i) having a molecular weight of about 2,000 to 7,000 of
   ($a_1$) a monohydric to hexahydric alkanol of 1 to 6 carbon atoms, a monoalkyl- or monoalkylolmonoamine of 1 to 6 carbon atoms, or a polyalkylenepolyamine of the formula $H_2N(CH_2CH_2NH)_rCH_2CH_2NH_2$ (wherein r is 0 to 3, and $a_2$) 1,2-propylene oxide;
   (ii) of a water-insoluble saturated or unsaturated, branched or straight chain aliphatic monoalcohol of 8 to 18 carbon atoms and ethylene oxide, 1,2-propylene oxide or mixtures thereof;
   (iii) of phenylphenol or an alkylphenol having 4 to 12 carbon atoms in the alkyl moiety thereof, and ethylene oxide, 1,2-propylene oxide or mixtures thereof;
   (iv) of an alkylene dicarboxylic acid having 3 to 10 carbon atoms, and 1,2-propylene oxide or polypropylene glycol;
   (v) of a fatty acid having 10 to 18 carbon atoms, and 1,2-propylene oxide or polypropylene glycol;
   (vi) of a fatty acid having 10 to 18 carbon atoms, a trihydric to hexahydric alkanol having 3 to 6 carbon atoms and 1,2-propylene oxide; or
   (vii) of a fatty acid having 10 to 18 carbon atoms, a polyalkylenepolyamine of the formula $H_2N(CH_2CH_2NH)_rCH_2CH_2NH_2$ wherein r is 0 to 3, and 1,2-propylene oxide;
   (3) is a reaction product condensate of a fatty acid having 8 to 22 carbon atoms and 1 to 2 moles, per mole of fatty acid of diethanolamine;
   (4) is an anionic compound of the formula $$R-A-CH_2CHO)_m-X$$
   $$\phantom{R-A-CH_2CH}|$$
   $$\phantom{R-A-CH_2CHO)_m-}R_1$$

wherein R is an aliphatic hydrocarbon radical of 8 to 22 carbon atoms, or a cycloaliphatic, aromatic or aliphatic-aromatic hydrocarbon radical having 10 to 22 carbon atoms, R is hydrogen or methyl, A is —O— or

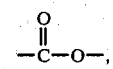

X is the acid radical of an inorganic oxygen containing polybasic acid, the acid radical of a polybasic lower carboxylic acid, or is —CH COOH, or a salt thereof, and m is 1 to 50; and in the further presence or absence of
   (5) 1.5 to 60 percent by weight of one or more conventional dyestuff formulating agents selected from the group consisting of inorganic salts, sodium benzenesulphonate, lignin sulphonates, dinaphthylmethanedisulphonates, sugars, dextrin, urea, ethylene oxide adducts or fatty amines, ethylene oxide adducts of polyalkylenepolyamines, foam control assistants, fungal growth inhibitors, bacterial growth inhibitors and anti-dusting agents.

2. A preparation according to claim 1, wherein the organic dye is soluble in water.

3. A preparation according to claim 1, wherein the organic dye is a metal complex dye.

4. A preparation according to claim 1, which contains an organic dye and 1 to 10 percent by weight of the mixture of component (2) and at least one of components (3) and (4), based on the weight of the preparation.

5. A preparation according to claim 4, wherein the weight ratio of component (2) to component (3) or (4), or to the two components, is 2:1 to 1:5.

6. A preparation according to claim 1, wherein the dye is a 1:1 or 1:2 metal complex of azo or azomethine dyes or metallised phthalocyanines.

7. A preparation according to claim 1, wherein the dye is an azo, anthraquinone or phthalocyanine reactive dye.

8. A preparation according to claim 1, wherein component (2) is a reaction product of ethylene glycol, propylene glycol, glycerol, trimethylolpropane, pentaerythritol, sorbitol, trimethylolethane or trimethylolpropane and 1,2-propylene oxide.

9. A preparation according to claim 1, wherein component (2) is a reaction product of a monoalkyl- or monoalkylol-monoamine having 1 to 6 carbon atoms or a polyalkylenepolyamine of the formula

in which r is 0 or a number from 1 to 3, and 1,2-propylene oxide.

10. A preparation according to claim 9, wherein component (2) is a reaction product of monoisopropanolamine or ethylenediamine and 1,2-propylene oxide.

11. A preparation according to claim 1, wherein component (2) is a reaction product of ethylene oxide or 1,2-propylene oxide or mixtures thereof and an aliphatic, saturated or unsaturated, branched or straight-chain monoalcohol having 8 to 18 carbon atoms.

12. A preparation according to claim 11, wherein component (2) is a compound of the formula

in which $R_3$ is a saturated or unsaturated hydrocarbon radical having 8 to 18 carbon atoms and s is a number from 1 to 10.

13. A preparation according to claim 1, wherein component (2) is a reaction product of ethylene oxide or 1,2-propylene oxide or mixture thereof and an alkylphenol having 4 to 12 carbon atoms in the alkyl moiety.

14. A preparation according to claim 13, wherein component (2) is a compound of the formula

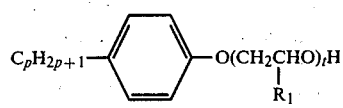

in which $R_1$ is hydrogen or methyl, p is a number from 4 to 12 and t is a number from 1 to 60.

15. A preparation according to claim 1, wherein component (2) is a reaction product of o-phenylphenol and 5 to 15 mols of ethylene oxide.

16. A preparation according to claim 1, wherein component (2) is a reaction product of a alkylene dicarboxylic acid having 3 to 10 carbon atoms and 1,2-propylene oxide or a polypropylene glycol.

17. A preparation according to claim 16, wherein component (2) is a reaction product of adipic acid or sebacic acid and 1,2-propylene oxide or a polypropylene glycol.

18. A preparation according to claim 1, wherein component (2) is a reaction product of a fatty acid having 10 to 18 carbon atoms and 1,2-propylene oxide.

19. A preparation according to claim 1, wherein component (2) is a reaction product of a fatty acid having 10 to 18 carbon atoms, a trihydric to hexahydric alkanol having 3 to 6 carbon atoms and 1,2-propylene oxide.

20. A preparation according to claim 1, wherein component (2) is a reaction product of a fatty acid having 10 to 18 carbon atoms, a polyalkylenepolyamine of the formula

in which n is 0 to 3 and 1,2-propylene oxide.

21. A preparation according to claim 1, wherein component (3) is a reaction product of coconut fatty acid, lauric acid, oleic acid or stearic acid and 2 mols of diethanolamine.

22. A preparation according to claim 1, wherein component (4) is a compound of the formula

in which n is a number from 1 to 9.

23. A preparation according to claim 22, wherein component (4) is a compound of the formula

in which $R_2$ is a saturated or unsaturated hydrocarbon radical, o-phenylphenyl or alkylphenyl having 4 to 12 carbon atoms in the alkyl moiety.

24. A preparation according to claim 23, wherein component (4) is a compound of the formula

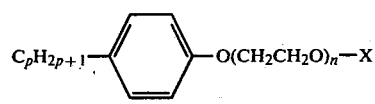

in which p is a number from 4 to 12.

25. A preparation according to claim 24, wherein component (4) is a compound of the formula

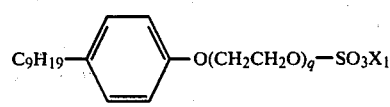

in which q is a number from 1 to 3 and $X_1$ is hydrogen, $NH_4$ or an alkali metal cation.

26. A preparation according to claim 1, wherein component (4) is a compound of the formula

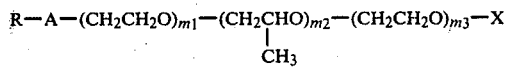
in which the sum of $m_1$, $m_2$ and $m_3$ is 2 to 20 and the ratio of ethylene oxide to propylene oxide units is 1:(1 to 2).
27. A preparation according to claim 1, wherein the compound of component (4) is in the form of an alkali metal salt, ammonium salt or amine salt.
* * * * *